United States Patent [19]

Langer et al.

[11] Patent Number: 4,774,770

[45] Date of Patent: Oct. 4, 1988

[54] FILM STRETCHING APPARATUS WITH SEVERAL CONSECUTIVE PROCESSING ZONES OR UNITS

[75] Inventors: Rudolf Langer, Lindau; Guenther Paulsen, Wasserburg; Gerhard Troetscher, Lindau, all of Fed. Rep. of Germany

[73] Assignee: Lindauer Dornier Gesellschaft mbH, Lindau, Fed. Rep. of Germany

[21] Appl. No.: 52,850

[22] Filed: May 20, 1987

[30] Foreign Application Priority Data

May 20, 1986 [DE] Fed. Rep. of Germany ................ 3616955216

[51] Int. Cl.⁴ ............................................. F26B 3/12
[52] U.S. Cl. ........................................ 34/60; 34/158; 34/216; 26/92; 26/106
[58] Field of Search ................. 34/155, 158, 216; 68/5 B, 5 D; 26/52, 51, 89, 92, 106

[56] References Cited

U.S. PATENT DOCUMENTS

| 2,265,071 | 12/1941 | Hartenbach | 34/158 |
| 3,371,428 | 3/1968 | Thygeson | 34/158 |
| 3,987,556 | 10/1976 | Tissot et al. | 34/155 |
| 4,137,649 | 2/1979 | Fleissner | 34/158 |
| 4,200,994 | 5/1980 | Mellor | 34/158 |
| 4,505,053 | 3/1985 | Andersson et al. | 34/155 |
| 4,600,181 | 7/1986 | Falco et al. | 34/155 |
| 4,663,863 | 5/1987 | Curry et al. | 34/155 |

Primary Examiner—Larry I. Schwartz
Attorney, Agent, or Firm—W. G. Fasse; D. H. Kane, Jr.

[57] ABSTRACT

A film stretching machine with tentering hook chain tracks extending through several consecutive processing zones is constructed of preassembled standardized exchangeable structural groups permitting a modular type of construction. These structural groups include venting cells of the same kind which are fully pre-equipped and are arranged along the left and right edges of the film web to be stretched. Exchangeable blower boxes with nozzle fingers or arms having a standardized width are installable between opposite venting cells of a processing zone. The dimensions of the venting cells are matched to the dimensions of typical shipping containers in order to achieve efficient packaging possibilities. The length of the venting cells advantageously corresponds to two or three times a standard spacing of adjustment spindles used for adjusting the spacing of the tentering hook chain tracks. The width of the standardized blower boxes may vary stepwise by twice the width of the venting cells.

15 Claims, 7 Drawing Sheets

FILM STRETCHING APPARATUS WITH SEVERAL CONSECUTIVE PROCESSING ZONES OR UNITS

FIELD OF THE INVENTION

The invention relates to a film stretching machine with several consecutive processing or treatment zones or units through which a continuous sheet or web of film-like material is transported by means of endless loop tentering hook chains guided in tentering hook chain tracks. Blower arrangements are appropriately provided in the various processing zones for blowing a treatment medium onto the web of material in a closed loop cycle in which the treatment medium is lead back to the blower arrangement and reprocessed. Blower boxes with blast discharge nozzles for the treatment medium extend across the full width of the web of material or film. The term "foil" as used herein is intended to be synonymous to "film" and "film-like" to cover synthetic material.

DESCRIPTION OF THE PRIOR ART

In such ffoil or film stretching machines the tentering hook chain tracks extending along the edges of the material web, are carried by spindles extending perpendicularly across the material transport direction. These spindles are arranged so that the spacing between the chain tracks is adjustable for accommodating webs or films of different widths. By these means consecutive processing zones may be formed which have differing processing widths so that an initially narrower width film may be stretched as it passes from zone to zone. The separate consecutive chain track sections are connected or hinged together in an articulated manner in the area where the spindles are located, so that the chain tracks of a respective processing zone may be arranged in parallel or with a diverging or even with a converging angle between them, depending on the specific purpose of the respective processing zone. Furthermore, typically, the spindles associated with each separate processing zone or field are arranged in an exactly determined spacing or distance from one another as seen in the material transport direction. Such distance or spacing is a so-called standard spacing. The spindles may be arranged at an integral multiple distance of this standard spacing.

It is also known that in many instances the tentering hook chain tracks are not directly carried by the spindles. Instead, specialized traverse girders carry the chains so that the spindles essentially only provide the adjustment capability for the chain track configuration. In this disclosure the reference to "spindles" shall include both of the above mentioned possible spindle arrangements. ments.

The treatment medium, such as air, is heated to specific temperatures and filtered in the processing zones before it is blown onto the material web or film. For this purpose the entire film stretching machine must be enclosed by an insulated housing. Thus, the total structure of such a machine may entail substantial dimensions for example, in many cases lengths of more than 30 m and widths of 5 to 12 m are involved. Furthermore, practically every film stretching machine requires a single-job or custom-built construction because the machines must be designed and built according to the respective requirements or on-site given situation.

Special problems are also associated with the complicated assembly of a machine at the factory or production plant for testing, with the following disassembly of the machine into component parts, and with the delivery of these parts to the assembly or installation site. A large transport volume is required for the bulky component parts of the machine. The final assembly at the installation site is involved and costly due to the many separate parts. The installation becomes even more problematic in those cases where the machine is to be assembled and installed, at least partially, in a basement or cellar room.

OBJECTS OF THE INVENTION

In view of the foregoing it is the aim of the invention to achieve the following objects singly or in combination:

to provide a film stretching machine which avoids the difficulties of the prior art by a construction which permits a simpler factory and on-site assembly directly on a floor;

to avoid the uneconomical transport of large cumbersome assemblies;

to build such a film stretching machine by utilizing a relatively small number of different, yet standardized components which may be assembled in various ways and numbers to allow on-site adaptation to size constraints and technical requirements of each specific installation; and to achieve a cost. economy by producing such standardized components, the parts of which are at least partially preassembled at the factory with due regard to the requirements of the final installation and to a simplified transport in a relatively small transport volume for the preassembled components ready for a final on-site assembly.

SUMMARY OF THE INVENTION

The above objects have been achieved in a film stretching machine according to the invention, constructed of standardized modular subassemblies for each processing zone. These modular subassemblies for each processing zone comprise fully equipped venting cells arranged to the left and to the right of the material web, and blower boxes insertable between respective venting cells. The venting cells are exchangeable and have standardized lengths. The blower boxes are also exchangeable and have standardized widths.

It has been found that providing as few as two standardized lengths for the venting cells, that is, a two-fold and a three-fold multiple of a standardized spacing between the adjustment spindles, practically all dimensional requirements with regard to length and width and with regard to production capacities of a film stretching machine may be satisfied. It is especially advantageous when the above mentioned standardized dimensions of the venting cells and blower boxes correspond to the dimensions of available freight containers typically used for transporting machine components in order to achieve an efficient packaging and transport of the fully equipped venting cells and blower boxes with their nozzles. Due to this modular construction using standardized components, both the production at the factory as well as the final on-site assembly are considerably simpler and more economical than in the prior art.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
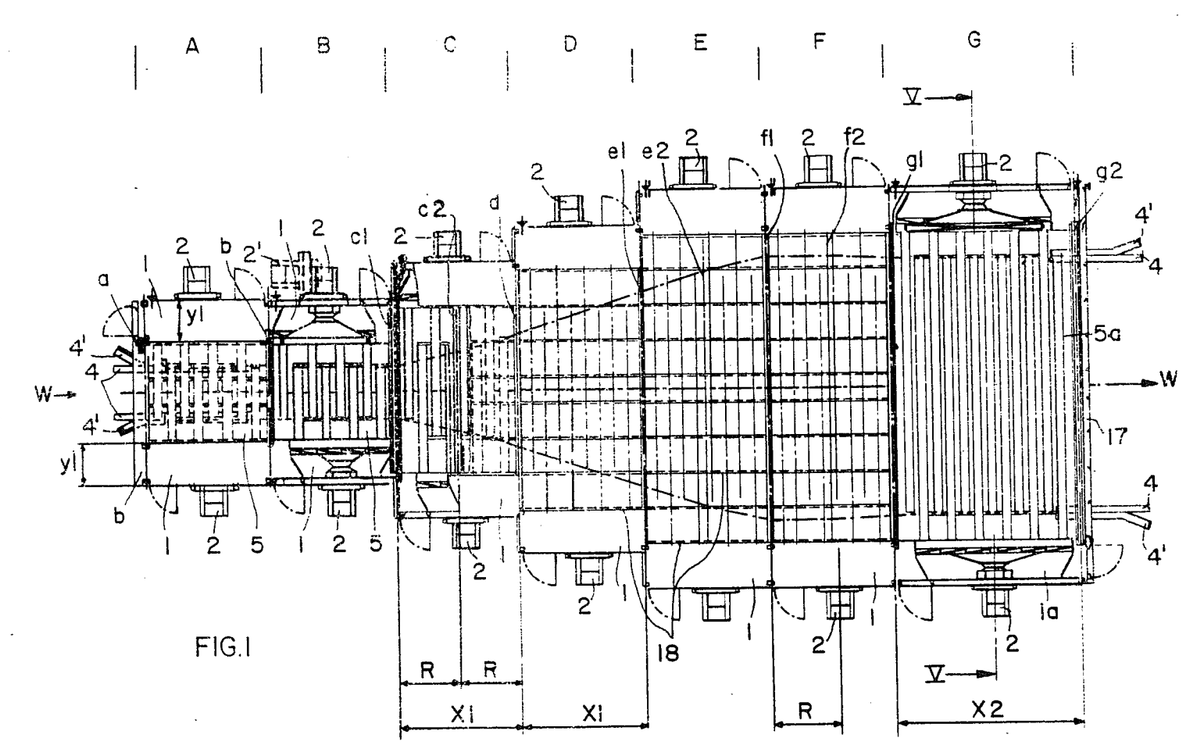
FIG. 1 is a top view of a complete assembly of a film stretching machine according to the invention.

FIG. 1 is a top plan view of a film stretching machine according to the invention, wherein the arrangement is shown partially uncovered or sectioned. Seven separate processing zones A to G are shown from left to right in FIG. 1. In the FIG. 1 the material web inlet is at the left and the material web outlet is at the right. A material web W travels from left to right through the machine as shown by an arrow W' at the outlet end on the right side. A tentering hook chain track is represented by short sections 4, 4' at the inlet and outlet including the forward track sections 4 running from left to right and the return track sections 4' running from right to left. These tracks are conventional and hence not illustrated in detail. The reversal guides and drive arrangements for the chains are also conventional and are not shown here for the sake of clarity. Within the film stretching machine the tentering hook chain track is shown by a dashed line.

One or more spindles are provided in each of the processing zones A to G for adjusting the spacing and relative orientation between the corresponding paired tentering hook chain guide tracks. One spindle is respectively arranged at the beginning of its processing zone, whereby, for example, a spindle a is arranged at the inlet of the processing zone A and a spindle b is arranged at the inlet of the processing zone B. In contrast thereto, two spindles c1 and c2 are provided for the processing zone C, whereby spindle c1 is located at the inlet of processing zone C and spindle c2 is located in the middle of zone C. Processing zone D again has one spindle d arranged at its left or upstream inlet end. The spindles are spaced in the transport direction W' of the material web W at a standard spacing R as, for example, shown between the spindles c1 and c2 or between the spindle c2 and the following spindle d.

The interspindle spacing between neighboring spindles may also entail a multiple of the standard spacing R as, for example, in the processing zones A, B, and shown for the processing zone D having the spacing x1 corresponding to twice the standard spacing R. The processing zones E and F respectively comprise two spindles e1 and e2 or f1 and f2 respectively in an arrangement similar to that of the processing zone C. The last processing zone G of the film stretching machine instead has one spindle g1 at its inlet or upstream end on the left and one spindle g2 at its outlet or downstream end on the right. The spacing x2 between these two spindles g1 and g2 corresponds to three times the standard spacing R. The spindles include known adjustment devices for tentering hook chain track carriers.

Figure 2:
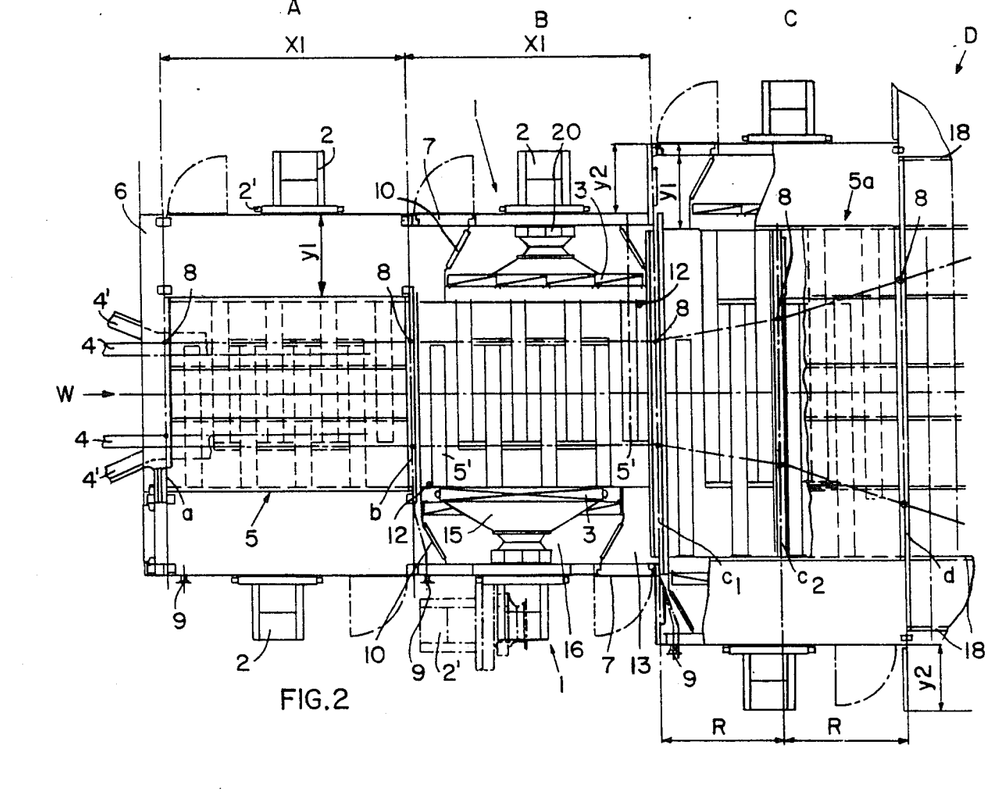
FIG. 2 is a somewhat enlarged top view of one processing zone of the machine of FIG. 1 having identical venting cells.

As shown in FIG. 2, the individual chain track sections are connected to each other by articulated joints 8. In this manner the orientation of the chain track direction in the separate processing zones may be adjusted so that the associated pair of tracks in any zone extends essentially in parallel as in the zones A, B, and G or at a diverging angle as in the zones C, D, and E or even at a converging angle as in the zone F of FIG. 1. The various spindles arranged at specific standard spacings R or full number multiples of R define the lengths of the separate processing zones. The tentering chain tracks may be directly carried by these spindles, or the tracks may be carried by traverse girders specifically provided for this carrying function, as mentioned above.

In each of the processing zones A to G, one venting cell 1 is arranged respectively on the left side and on the right side of the material web W. Each venting cell 1 is equipped with means for treating the treatment medium including a circulating device or pump 2 and a processing or reprocessing mechanism 3 for the treatment medium as shown, for example, in FIG. 2. The reprocessing mechanism includes a heater and a filter. The length of each venting cell 1 in the travel direction W' corresponds to the length of the respective separate processing zone, for example, the length x1 in the zones C or D is equal to two times the standard spacing R or the length x2 in the zone G is equal to three times the standard spacing R. The individual venting, cells 1 have a width y1 perpendicular to the travel direction, W'. The dimensions of the venting cells 1 are determined so that the cell dimensions match the shipping container sizes while also satisfying the necessary technical requirements. For example, the venting cells may be dimensioned so that two standardized cells may be efficiently packed next to one another in a single container for shipping. Further structural details of the venting cells 1 and associated equipment will be more closely described below.

Each pair of venting cells 1 serves as a lateral boundary of a respective processing zone A, B, .... Depending upon the particular arrangement of the respective processing zone, an appropriately exchangeable blower box 5, 5a, ... may be installed between two venting cells 1 forming a pair, as will be described below. The blower boxes are manufactured with standardized dimensions in a manner similar to the venting cells 1. Different dimensions are shown for the blower boxes 5 in the processing zones A and B on the one hand, and for the blower boxes 5a in the processing zone G on the other hand. For example, in a preferred system four different standardized width dimensions of the blower boxes in the travel direction W' are provided. the widths of the blower boxes determine the lengths of the respective processing zone in the travel direction W'. The length of the blower boxes perpendicularly to the travel direction W' is determined by the spacing between the respective venting cells forming a pair. With such standardized dimensions and through the modular construction practically all possible required machine sizes and shapes may be produced for the film stretching machine. Advantageous size relationships between blower boxes arranged in consecutive processing zones are expressed by two times y2, wherein y2 is the approximate length of the circulating device in a direction perpendicularly to the travel direction W'. In other words, a zone next downstream of any given zone, as viewed in the travel direction W', is longer by $2 \times y2$ in the direction across the travel direction W' than the neighboring upstream zone.

As shown in FIGS. 1 and 2, the film stretching machine is closed at its inlet end by an inlet wall 6 and at its outlet end by an outlet wall 17. The top and bottom of the film stretching machine are covered by cover plates 18 to form a fully enclosed insulated housing. The plates 18 are oriented in the material web transport direction W' and have standardized dimensions corresponding to the lengths x1 or x2 of the respective processing zone.

The venting cells 1 may be completely manufactured at the factory and then transported. In the exceptional case that the transportation becomes problematic, the pump 2 and its housing may be removed from the venting cell 1 and separately transported. In order to facilitate such removal the pumps 2 are hinged to swing outwardly away from the venting cell 1. These features assure an advantageous transport volume, even in the exceptional case that two pairs of venting cells 1 without their pumps 2 are placed in one container for shipping.

FIG. 2 shows a portion, namely three processing zones A, B, and C, of the entire film stretching machine of the type shown in FIG. 1. The tentering hook chain track at the machine inlet comprises the feed or forward tracks 4 and the return tracks 4'. The extension of the tentering hook chain tracks through the processing zones is shown in a simplified manner by dash-dotted lines. Articulated joints 8 are shown at the location of each respective adjustment spindle a, b, c1, and c2. Hand wheels 9 are shown at the outside wall of the venting cells 1 for adjusting the spindles a, b, etc. The spindles c1 and c2 and d are again arranged at the standard spacing distance R from one another, whereas the spacing distance x1 between the spindles a, b, and c respectively corresponds to twice the standard spacing.

All of the processing zones in this embodiment are equipped with similar standardized venting cells 1 on the left side and on the right side of the material web W. The venting cells 1 have a length x1 of twice the standard spacing R in the direction W'. The cells 1 have a width y1 in a direction perpendicularly to the width W'. The blower boxes 5 having a standardized width are installed between two venting cells 1 located opposite each other along the edges of a processing zone. The blower boxes 5 comprise individual nozzle fingers or rather arms which extend substantially horizontally from the respective cell 1 above and below the material web W. The nozzle arms above the web W intermesh from both sides in the manner of two combs and so do the nozzle arms below the web W. As is shown, the width of the blower boxes in the processing zone A and B is different from that in the processing zone C. Thus, the blower boxes 5 are of one size in processing zones A and B, and the blower boxes 5a of another size are in the processing zone C. The width difference between the blower boxes 5 and the blower boxes 5a is determined by the lateral displacement y2 of the consecutive ventin cells 1 in the processing zone B and the processing zone C. This lateral displacement y2 is somewhat smaller than the width y1 of the venting cells 1. Thus, the width difference between two consecutive different blower boxes 5a and 5 is given as two times y2, as explained above. A similar relationship is repeated between other consecutive processing zones having differing widths in the direction perpendicularly to the travel direction.

Figure 5:
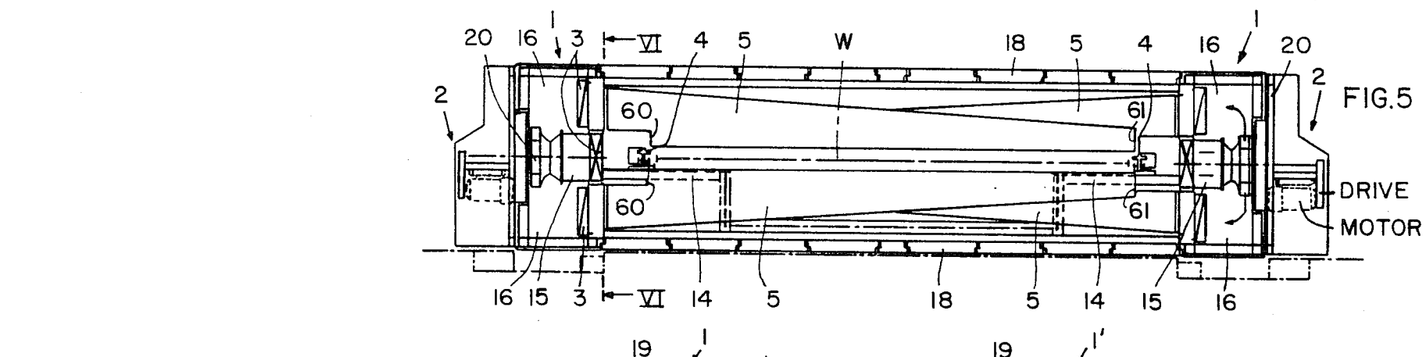
FIG. 5 is a sectional view along the line V—V of FIG. 1 through a processing zone according to FIG. 2.
Figure 6:
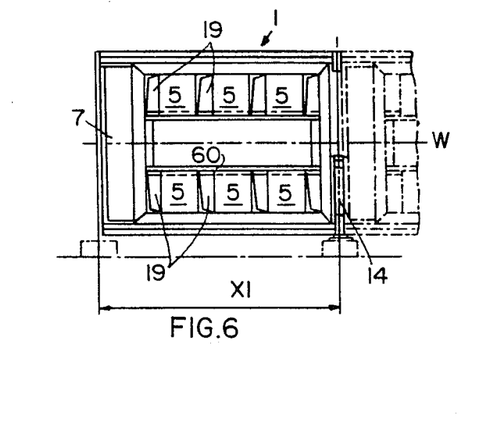
FIG. 6 is a side view along the line VI—VI of FIG. 5 of a venting cell of a film stretching machine according to FIG. 2.

FIG. 2 further shows various details of the construction of the venting cells 1 in the processing zone B. The outside wall of a venting cell 1 is constructed as an insulating wall. The circulating pump 2 for the treatment medium is hinged to this outside insulating wall so that it may swing away from its venting cell 1. The swung-away position of the pump 2 is shown by dash-dotted lines 2'. The circulating pump 2 typically comprises an outside circuit box with a motor, etc. and a blower 20 which lies within the venting cell 1 during operation. Further components within the venting cell 1 include a suction shaft 15 leading from the treatment space to the blower 20 as well as the pressure chamber 16 with its guide walls 10 leading from the blower 20 to the blower boxes 5. Furthermore, the reprocessing device 3 for the treatment medium is also installed in the venting cell 1. Each reprocessing device 3 typically includes a filter and a heater for the processing xedium such as air. Next to the circulating pump 2 there is an access door 7 passing through one side of the outer wall to allow access to the inside of the venting cell 1 or to the processing zone for maintenance purposes. As shown more clearly in FIGS. 6, 7, and 9, the inner wall of the venting cell 1 comprises openings 19 for connecting the blower boxes 5, 5a or rather, the separate nozzle fingers or arms of the blower boxes 5. In the comb-like intermeshing of the blower boxes as shown here, adjacent nozzle fingers or arms are alternately supplied with treatment medium from one side or from the other side, that is, from one or the other venting cell. The separate nozzle fingers or arms need not be attached in a cantilevered or self-supporting manner to the respective supply opening 19 in the inner wall of the venting cell 1. Instead, the free ends of the nozzle fingers or arms may be interconnected by a support strut 60, 61 as is shown in FIGS. 5 and 6. Details of such mounting or support struts are not described.

It is also possible not to include the respective outermost nozzle finger or arm 5' of a blowing box 5 in the interconnected support. Rather, such an outer nozzle arm may be hinged to the inner wall of the corresponding venting cell 1 by a hinge bearing 12 shown, for example in the processing zone B. By these hinges 12 the outer nozzle fingers or arms 5' may be tilted into the dash-dotted line position until it contacts the first nozzle finger or arm of the next processing zone C in order to provide access to the interior of the processing zone B through the door 7 and through the venting cell 1. It is thereby easy to carry out any required maintenance, for example, on the spindle c1. Access to the spindle is improved in this manner at least to the middle of the material web. In order to provide access to the remaining portion of the spindle, the opposite side of the machine comprises an access door 7 in an analogous manner, whereby the nozzle finger or arm located directly opposite the access door 7 is similarly hinged at 12 as shown in FIG. 2.

The construction of the neighboring processing zones A and C is completely analogous to the construction of the described processing zone B. In each zone standardized, similar venting cells 1 are used. The only differences in the dimensions are in the width of the blower boxes 5 and 5a installed between the corresponding paired venting cells 1. As mentioned above, the width difference between the blower boxes of neighboring processing zones of different widths, is given by twice the standardized length y2. The transition to an even wider processing zone is indicated in FIG. 2 at the end of the processing zone C. Half of the width differential is shown as y2 on one side of the widest indicated zone. The standardized insulation plates 18 are shown in the processing zone C as well as the adjacent wider processing zone D which is merely partly indicated in FIG. 2. As is shown, these cover plates 18 serve to form a closed insulated housing which encloses the entire machine.

In FIG. 1, the final processing zone G has a length x2 as seen in the travel direction W' of the material web W. This length x2 corresponds to three times the standard spacing R. The construction of the venting cells 1a required in this zone G only differs from the above described venting cells 1 in terms of length. Therefore, the venting cell 1a will not be described in detail. An embodiment having venting cells with a length four times the standard spacing R is also conceivable, however, a description of such an embodiment would be superfluous because it could be simply assembled from two standardized venting cells of the above described type having a length of two times the standard spacing R.

Figure 3:
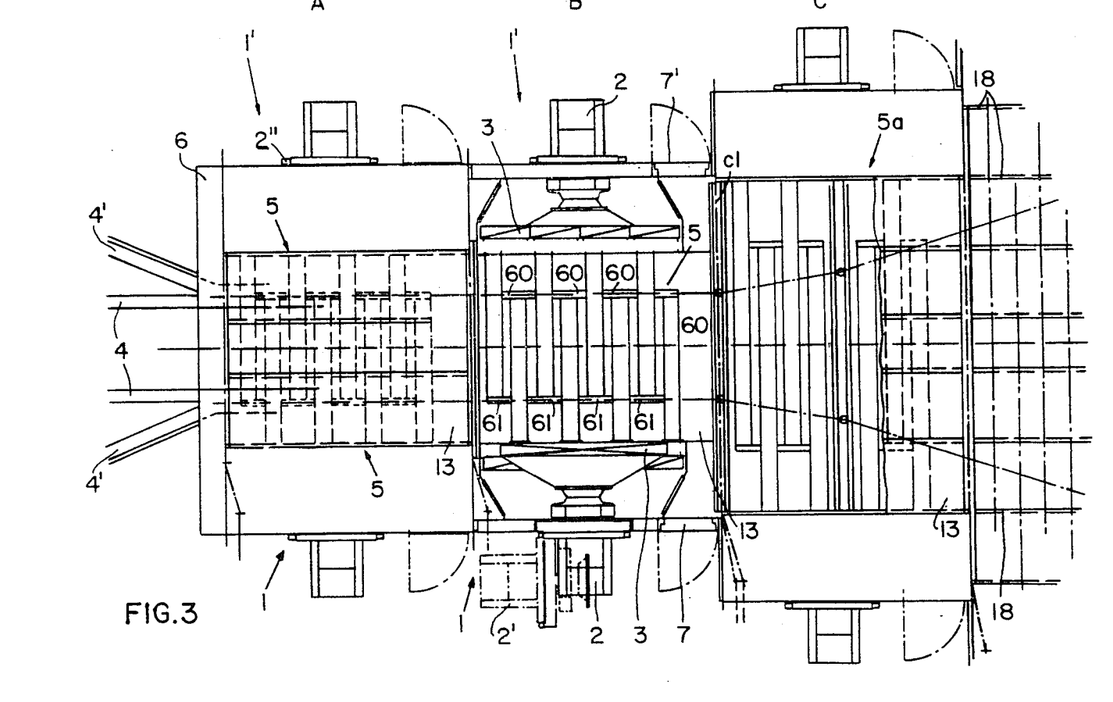
FIG. 3 is an enlarged top view of one processing zone similar to that of FIG. 2, but with mirror-symmetrically arranged venting cells.

The embodiment shown in FIG. 3 corresponds substantially to the embodiment of FIG. 2, except in that completely similar venting cells 1 are not used throughout. Instead, a mirror-reflected arrangement of venting cells 1 and 1' is provided along the right and left side of the material web W. The actual construction of the blower ducts is similar to that described above and will not be described again in detail here. However, it should be noted that due to the mirror-symmetrical arrangement, the access doors 7 and 7' respectively of the venting cells 1 and 1' are located directly opposite one another to the right and left of the web W. Furthermore, through this arrangement a through-going maintenance passage 13 is formed between the blower boxes 5 of, for example, the processing zone B and the following adjustment spindle c1. This advantageous arrangement is possible because a separate nozzle finger or arm no longer is located directly opposite the access door 7 or 7'. Thus, a hinged connection for one of the nozzle fingers or arms is also no longer necessary.

Figure 4:
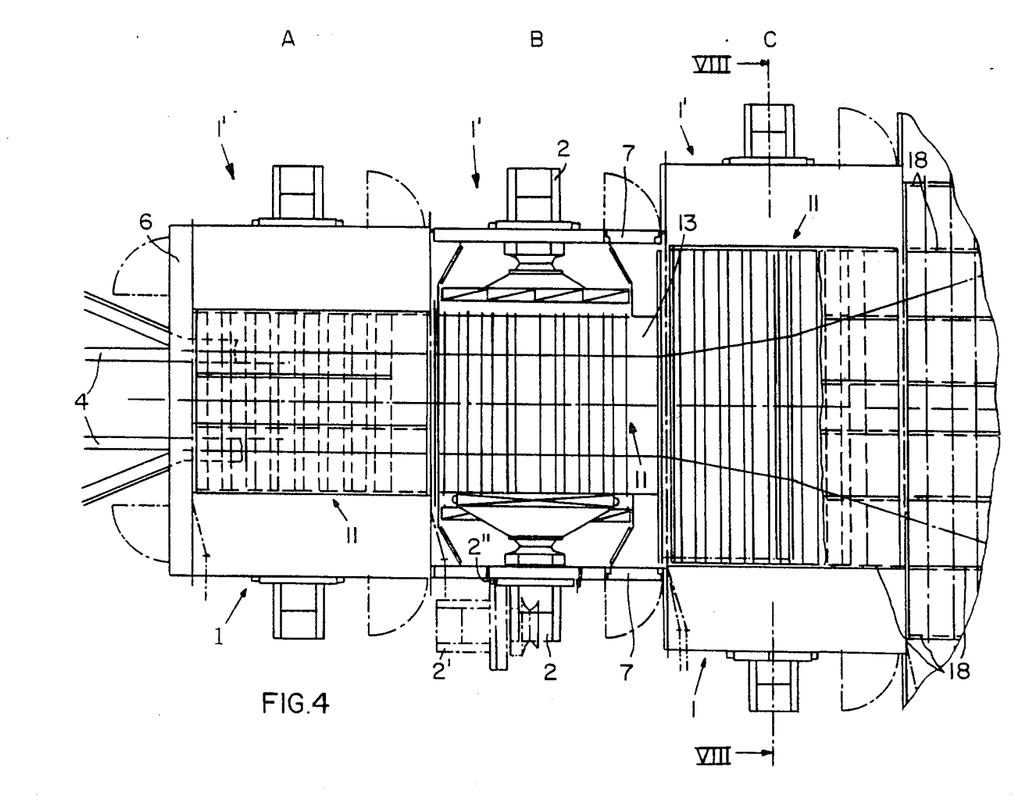
FIG. 4 is a modified embodiment similar to that of FIG. 3, showing the same venting cells but different blower boxes.

The arrangement according to FIG. 4 shows a modification of that of FIG. 3. A mirror-symmetrical arrangement of the venting cells 1 at the edges of the processing zones is again used in FIG. 4. However, a different type of blower boxes 11 is usable in FIG. 4, wherein the blower boxes 11 extend from one venting cell 1 to the opposite venting cell 1', whereby the blower boxes are supplied with the treatment medium from both sides simultaneously. In this arrangement of blower boxes 11 twice as many treatment medium supply openings 19 for connection with the venting cell are required as in the above described example having comb-like intermeshing blower boxes 5. This comparison may be seen in FIGS. 6 and 7 for the blower boxes 5 and in FIG. 9 for the blower boxes 11. Furthermore, in this arrangement with both ends of the blower boxes 11 connected to the venting cells, it is no longer necessary to support the free ends of the nozzle fingers as described with reference to FIG. 2.

FIG. 5 shows the basic structure of a film stretching machine according to the invention as a cross-section along the line V—V in FIG. 1. A venting cell 1 with its circulation pump 2, blower 20, and reprocessing device 3 is arranged along the left and right side of the material web W. The circuit box and the drive for the circulation pump 2 is located outside of the outer wall of the venting cell 1, whereas the blower 20 is completely within the venting cell 1. In this embodiment comb-like intermeshing blower boxes 5 of the type described with reference to FIG. 2 are provided. An upper and a lower row of nozzle fingers or arms are alternately supplied with treatment medium from the left and from the right venting cell 1. The material web W is shown by a dash-dotted line between the upper and lower venting boxes. The tentering hook chain tracks 4 are shown along the lateral edges of the material web W. The tracks 4 are carried by support girders 14 in such a manner that the distance between opposite chain tracks, that is the material web width, is adjustable, for example, by spindles.

In the venting cells 1, the blowers 20 are connected to a suction shaft 15 for transporting the treatment medium as shown by the arrows from the suction shaft 15 into the pressure chambers 16. From the pressure chambers 16 the medium is then directed into the blower boxes 5 from which it is blown through nozzles onto the material web W. Thereafter, the treatment medium is again sucked into the suction shaft 15 between the nozzle fingers or arms of the blowing box 5. Typically, the reprocessing devices 3 such as, for example, filters and heaters are installed in the venting cells 1 in this circuit flow of the treatment medium. As is further shown in FIG. 5 the processing zone is sealed or insulated relative to the floor and to the outside environment by means of insulation plates 18 applied as shown. The plates or panels 18 are also sealed to each other, e.g. by shiplap or tongue-and-groove seams.

FIG. 6 is a view according to the line VI—VI of FIG. 5 showing the inside wall of a venting cell 1 having the standardized structural length x1. Passage or connecting openings 19 are located on the inner wall for connecting the nozzle fingers or arms of the blower boxes 5 to the venting cell. The material web W is shown as a dash-dotted line being transported between an upper and a lower blower box 5. The access door 7 is clearly visible at the left side of the inner wall of the venting cell 1. A support girder 14 for the chain track 4, 4' is indicated at the right end of the inner wall. An opening 19 with its associated necessary attachment fittings corresponds with each nozzle finger or arm of blower boxes attached to the respective venting cell 1. Furthermore, at the right edge of FIG. 6, dash-dotted lines are used to indicate the connecting venting cell of a consecutive or adjacent processing zone.

Figure 7:
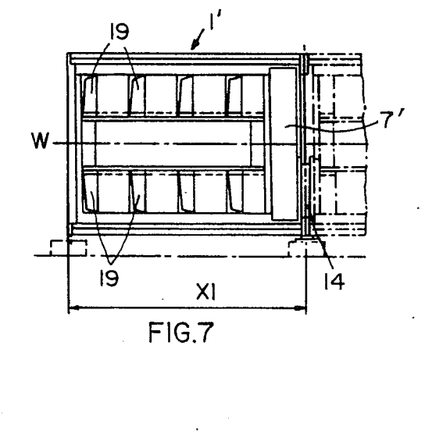
FIG. 7 is a side view similar to that of FIG. 6, but of a modified venting cell for a film stretching machine according to FIG. 3.
Figure 8:
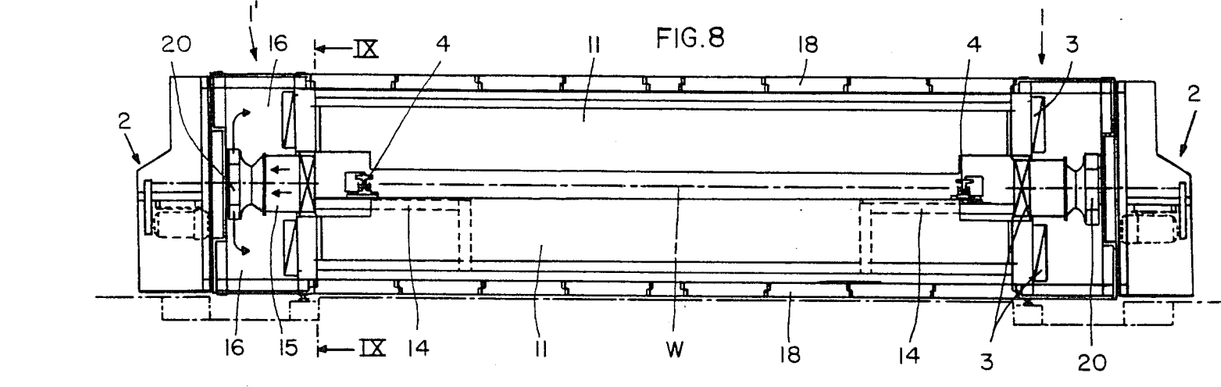
FIG. 8 is a sectional view along the line VIII—VIII through a processing zone for a film stretching machine of FIG. 4.

The view and arrangement of FIG. 7 essentially corresponds to that of FIG. 6, except that the venting cell 1' of FIG. 7 comprises a mirror-symmetrical arrangement as described above. Therefore, the access door 7' located at the right end of the inner wall of this venting cell 1'. FIG. 8 shows a view similar to that of FIG. 5, except that through-going blower boxes 11 are shown here rather than the comb-like intermeshing blower boxes 5 of FIG. 5. The blower boxes 11 here are supplied with treatment medium from both sides or ends, or rather, from both venting cells 1 and 1' to which each blower box 11 is connected as shown. In this embodiment the use of mirror-symmetrical blower ducts 1 and 1' is advantageous in order to create the through-going maintenance passage as shown in FIG. 4. Further structural details and the mode of operation of the arrangement of FIG. 8 correspond to that of FIG. 5 and will not be discussed in detail again.

Figure 9:
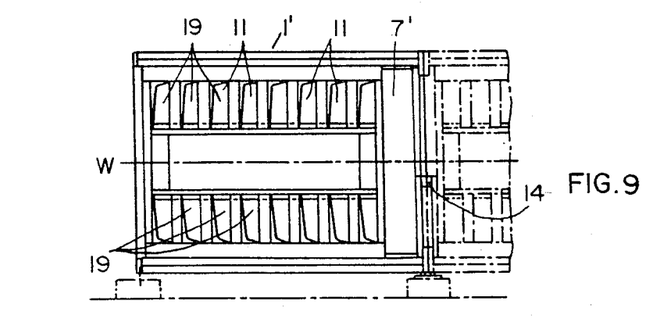
FIG. 9 is a side view along the line IX—IX of FIG. 8 or of a venting cell for a film stretching machine of FIG. 8.
Figure 10:
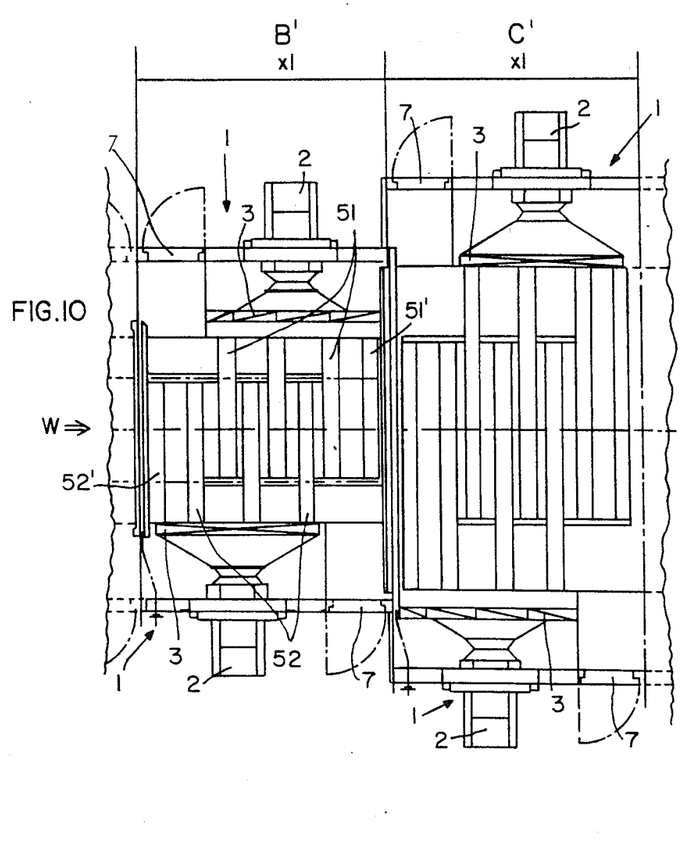
FIG. 10 shows a modification of the arrangement of the blower boxes.

FIG. 9 is a view according to the section line IX—IX of FIG. 8 of the inner wall of a venting cell 1'. It is clear that the number of connecting ports or openings 19 in this embodiment employing so-called two-ended blower boxes 11 must be twice the number of openings 19 required for a comb-like arrangement as shown in FIGS. 6 or 7 for an equivalent number of nozzle fingers or arms. The respectively required number and arrangement of openings 19 in the inner wall of the blower box 1 or 1' can be produced without any difficulties during the prefabrication. It is also possible to produce only venting cells having the largest possible number of passage openings 19, whereby any unnecessary openings 19 may be simply covered during on-site installation. Further details of FIG. 9 are similar to those of FIGS. 6 and 7 and will not be described again. FIG. 10 shows one of the many possible variations of the basic concept of the invention. Two adjacent processing zones B' and C' are shown having a basic structure which is analogous to that of the film stretching machine shown in FIG. 2. The venting cells 1 having a standard length x1 are of similar construction and are arranged along the left and right edges of the material web W indicated by an arrow. The venting cells 1 are fully equipped with a reprocessing circulating pump 2 and with a reprocessing device 3. Also, doors 7 are provided for access to the interior of the processing zones. However, the arrangement of the separate nozzle fingers or arms on each venting cell is somewhat different from the arrangement shown in FIG. 2 or in FIG. 3. The difference of the embodiment of FIG. 10 as compared to that of FIG. 2 is that the two opposite intermeshing groups of nozzle fingers or arms which are connected either to the left venting cell or to the right venting cell are here shifted by, for example, one nozzle finger spacing distance in a direction parallel to the direction of the material web W. However, the outermost nozzle fingers or arms retain their unshifted position. Thus, the interfinger spacing of the outermost pair of fingers of each the left and right group is reduced by half. In this arrangement two neighboring nozzle arms at the beginning and at the end of a processing zone B' or C' are located directly opposite an access door 7. These two neighboring nozzle arms are connected on the same web edge to the same venting cell 1. For example, at the beginning of the processing zone B' a single nozzle finger or arm 52' is located adjacent to a group 52 of three nozzle fingers or arms. Similarly, at the end of the processing zone B' a last nozzle finger or arm 51' is located adjacent to a group 51 of three nozzle finger arms all connected to the same venting cell 1. Through this arrangement of the nozzle fingers, the inner wall of the venting cell 1 can be somewhat shorter than is necessary for the arrangement of FIG. 2 while allowing for the connection of the same number of nozzle fingers or arms 51, 51', 52, 52'. Due to this effect, a wider access passage into the interior of the processing zone is created without detracting from the advantages of a modular construction. The free ends of the nozzle fingers or arms 51, 51' and 52, 52', which are attached to the blower duct 1, may be interconnected by some means of support as discussed above. It is also possible, when necessary, to attach the outermost nozzle fingers or arms 52', and 51' in a hinged manner so as to allow them to swing or tilt for improving the accessability to the interior as described with reference to FIG. 2.

In any case, the separate venting cells of the various embodiments described above may be arranged advantageously as initially discussed for packing into shipping containers. The separate blower boxes with their nozzle fingers or arms and the housing plates 18 for the separate processing zones may similarly be efficiently containerized. The construction of the present film stretching machine proceeds with the mounting of completely preassembled venting cells 1 onto prepared footings on the floor of the installation site. The plates 18 form the bottom housing insulation. The various spindles and chain tracks, as well as the blower boxes 5 or 11, may also be installed as completely preassembled components. A preassembled inlet wall 6 (see FIG. 2) can be used. Preassembled closure plates 17 shown in FIG. 1 or similar covers may be installed as the end wall of the housing at the exit of the film stretching machine. The separate processing zones are sealed and insulated from above by the mentioned insulation plates 18.

Due to the modular construction of the machine and its standardized components having dimensions specifically suited to shipping container dimensions, cost advantages are achieved in the manufacturing of the components, in the transportation of components in an optimally small transport volume, and in the final assembly and installation of the various preassembled components. Furthermore, in the final assembly it is possible to fit the film stretching machine to any desired or required length and width. By appropriately combining various standardized lengths of venting cells processing zones of various lengths may be produced. The necessary number of similarly standardized blower boxes is easily inserted or installed in the processing zones of various lengths. Variations or additions to the standardized components which may be desired in practice or possibly become necessary do not, or at least do not considerably detract from the advantages which are achieved according to the invention.

Although the invention has been described with reference to specific example embodiments, it will be appreciated that it is intended to cover all modifications and equivalents within the scope of the appended claims.

What we claim is:

1. An apparatus for stretching a film of synthetic material in a direction across a film travel direction (W') through the apparatus to make said film wider, comprising standardized housing means for enclosing a space in an insulating manner, said housing means having an inlet end and an outlet end, endless tentering means including two tentering chains spaced from each other and carrying film holding members, said tentering chains travelling through said housing means from said inlet end to said outlet end, said tentering chains having a spacing from each other, so that said tentering chains diverge from each other at least along a portion of their path through said housing means for causing said stretching, a plurality of standardized treatment zones between said inlet end and said outlet end, a plurality of standardized modular exchangeable venting cell means arranged along each side of said web so that two venting cell means forming a pair are located opposite to each other for supplying a treatment medium into said apparature, said modular venting cell means having a standardized length $(x1, x2)$ in said travel direction and a standardized width $(y1+y2)$ across said travel direction, said modular exchangeable venting cell means comprising means for treating said treatment medium including means for circulating and reprocessing said treatment medium, and exchangeable blower boxes having a standardized length across said travel direction, said blower boxes having a standardized width in said travel direction corresponding to said standardized length of said modular venting cell means, at least one of said blower boxes being insertably located between two venting cell means forming each pair, for blowing treatment medium onto said web.

2. The apparatus of claim 1, further comprising spindle means extending in a direction across said travel direction (W') and arranged for adjusting said spacing between said two tentering chains, said spacing being adjustable within a standardized adjustment range (R'), said standardized length $(x1, x2)$ of said modular venting cell means in said travel direction (W') corresponding to a full number multiple of at least twice said adjustment range (R), said spindles being spaced from each other in said travel direction so that a spindle spacing between two neighboring spindles corresponds to said adjustment range or to a whole number multiple of said adjustment range (R).

3. The apparatus of claim 1, wherein said venting cell means 1, 1a) comprise access doors (7), said blower boxes being arranged to provide a through-going maintenance passage (13) inside said housing means, said doors providing access to said through-going maintenance passage.

4. The apparatus of claim 1, wherein said circulating means of said treatment medium treating means comprise fully preassembled pump means (2) for circulating said treatment medium and hinge means (2") for hinging said pump means to said venting cell means for tilting said pump means outwardly relative to said housing means.

5. The apparatus of claim 1, wherein said venting cell means are of identical construction on both sides of said material web (W).

6. The apparatus of claim 1, wherein said venting cell means along one edge of said material web (W) are of mirror-symmetrical construction relative to venting cell means arranged along the other edge of said material web (W).

7. The apparatus of claim 1, wherein said standardized length of said exchangeable blower boxes across said travel direction increases from one of said treatment zones to another treatment zone by twice a standardized increment (y2), said standardized increment (y2) forming part of said standardized width $(y1+y2)$ of said modular venting cell means across said travel direction.

8. The apparatus of claim 1, wherein said blower boxes are arranged in pairs between and connected to said venting cell means for receiving treatment medium from said venting cell means, each blower box comprising a plurality of nozzle fingers or arms reaching across said travel direction, whereby said nozzle fingers or arms extending from one blower box arranged along one edge of said web intermesh in a comb-like manner with the nozzle fingers or arms extending from the opposite blower box arranged along the other edge of the web.

9. The apparatus of claim 1, wherein said blower boxes (11) comprise nozzle fingers or arms interconnecting venting cell means arranged along one edge of said web (W) with venting cell means arranged along one edge of said web (W) with venting cell means arranged along the opposite edge of said web (W), whereby said nozzle fingers or arms receive treatment medium at each end thereof and extend across said travel direction.

10. The apparatus of claim 1, wherein said venting cell means comprise access doors into said housing means, said blower boxes comprising nozzle arms or fingers connected to the respective venting means, whereb a nozzle arm or finger on one side of said web is arranged opposite an access door on the other side of said web, and hinge means (12) for securing said nozzle arm or finger in a tiltable manner to the respective venting means, whereby said nozzle arm or finger is movable out of the way for increasing the access into said housing means.

11. The apparatus of claim 10, wherein said access doors in any one of said treatment zones are arranged diagonally opposite each other on opposite sides of said web (W).

12. The apparatus of claim 1, wherein said venting cell means comprise access doors into said housing means, whereby any one of said treatment zones has two access doors arranged directly opposite each other on opposite sides of said, web, said apparatus further comprising a maintenance passage (13) extending in the respective treatment zone from one access door to the opposite access door.

13. The apparatus of claim 1, wherein said blower boxes comprise nozzle arms or fingers connected to said venting cell means for receiving treatment medium from said venting cell means, said venting cell means comprising access doors arranged diagonally opposite each other in a respective treatment zone on opposite sides of said web, said nozzle arms or fingers being so arranged that two nozzle arms or fingers end in front of each door near the opposite side or edge of said web (W).

14. The apparatus of claim 13, wherein said nozzle arms or fingers are arranged as comb-type groups and so that the nozzle arms or fingers of one group intermesh with the nozzle arms or fingers of the opposite group in such a way that said two nozzle arms or fingers in each group are located at an end of the respective group without intermeshing with the other group and so as to end in front of said door.

15. The apparatus of claim 1, wherein said tentering chains are diverging in said one portion of said path and then again slightly converging in a portion of said path downstream of said first mentioned portion.

* * * * *

UNITED STATES PATENT AND TRADEMARK OFFICE
CERTIFICATE OF CORRECTION

PATENT NO. : 4,774,770

DATED : October 4, 1988

INVENTOR(S) : Rudolf Langer, Guenther Paulsen, Gerhard Troetscher

It is certified that error appears in the above-identified patent and that said Letters Patent is hereby corrected as shown below:

Claim 1, Column 11, line 6, replace "apparature" by --apparatus--.

Claim 2, Column 11, line 24, replace "(R')" by --(R)--.

Claim 3, Column 11, line 34, replace "1, 1a)" by --(1, 1a)--.

Claim 9, Column 12, line 12, delete "with venting cell means arranged along";
line 13, delete "one edge of said web (W)".

Claim 10, Column 12, line 22, delete "whe-";
line 23, replace "reb" by --whereby--.

Claim 12, Column 12, line 37, delete "," (first occurrence).

Signed and Sealed this

Fourteenth Day of February, 1989

Attest:

DONALD J. QUIGG

*Attesting Officer*  *Commissioner of Patents and Trademarks*